United States Patent [19]

Srinivasan

[11] Patent Number: 5,686,529
[45] Date of Patent: Nov. 11, 1997

[54] PAINTED POLYMERIC ARTICLES HAVING IMPROVED PROPERTIES

[75] Inventor: Satchit Srinivasan, Carrollton, Tex.

[73] Assignee: D&S Plastics International, Grand Prairie, Tex.

[21] Appl. No.: 469,579

[22] Filed: Jun. 6, 1995

Related U.S. Application Data

[63] Continuation-in-part of Ser. No. 311,843, Sep. 23, 1994, Pat. No. 5,498,671, which is a continuation of Ser. No. 16,586, Feb. 10, 1993, abandoned.

[51] Int. Cl.$^6$ .............................. C08L 51/00; C08L 23/00
[52] U.S. Cl. .................... 525/74; 525/240; 525/78; 525/80; 525/63; 525/71; 428/424.8; 428/424.2; 428/500
[58] Field of Search ............... 525/240, 74, 79, 525/78, 80, 63, 71; 428/500, 424.8, 424.2

[56] References Cited

U.S. PATENT DOCUMENTS

| | | | |
|---|---|---|---|
| 3,862,106 | 1/1975 | Fischer | 525/240 |
| 3,884,993 | 5/1975 | Gros | 525/211 |
| 4,536,547 | 8/1985 | Lundberg et al. | 525/186 |
| 4,607,074 | 8/1986 | Hazelton et al. | 525/240 |
| 4,833,194 | 5/1989 | Kuan et al. | 525/240 |
| 4,843,128 | 6/1989 | Cesare | 525/193 |
| 4,843,129 | 6/1989 | Spenadel et al. | 525/193 |
| 5,011,891 | 4/1991 | Spenadel et al. | 525/211 |
| 5,162,441 | 11/1992 | Nakata et al. | 525/194 |
| 5,214,103 | 5/1993 | Imao et al. | 525/211 |
| 5,239,000 | 8/1993 | Kimm et al. | 525/240 |
| 5,498,671 | 3/1996 | Srinivasan | 525/240 |

FOREIGN PATENT DOCUMENTS

| | | |
|---|---|---|
| 0 519 691 A2 | 12/1992 | European Pat. Off. . |
| 0 537 368 A1 | 4/1993 | European Pat. Off. . |

*Primary Examiner*—Mark L. Warzel
*Attorney, Agent, or Firm*—Pennie & Edmonds LLP

[57] ABSTRACT

Thermoplastic olefin compositions having improved fluid resistance when painted with flexible coatings such as polyurethanes paints and the like are disclosed. These compositions include a thermoplastic olefin such as crystalline polypropylene, crystalline polyethylene, or mixtures thereof with a first rubber component of an ethylene-propylene or ethylene-propylene-diene rubber having a Mooney Viscosity of 10–120 and a second rubber component of an ethylene-propylene or ethylene-propylene-diene rubber having a number average molecular weight of between about 1,000 and 10,000.

20 Claims, No Drawings

PAINTED POLYMERIC ARTICLES HAVING IMPROVED PROPERTIES

CROSS-REFERENCE TO RELATED APPLICATIONS

This application is a continuation-in-part of application Ser. No. 08/311,843, filed Sep. 23, 1994, now U.S. Pat. No. 5,498,671, which application was a continuation of application Ser. No. 08/016,586, filed Feb. 10, 1993, now abandoned.

FIELD OF THE INVENTION

The invention relates to articles of manufacture that are characterized by improved adherence for coating materials such as paints. The invention particularly relates to articles of manufacture comprising coated, polyolefin compositions which have improved resistance to petroleum fluids such as gasolines and the like.

BACKGROUND OF THE INVENTION

Polymer blends can be formed or shaped into lightweight and durable articles useful, for example, as automobile parts, toys, and housings for various types of equipment. Unfortunately, polymer blends such as those formed of polyethylene, polypropylene and rubber are difficult to treat so that the paint durably adheres to the surface of the article. Paint adhesion is a particular concern in the case of blends derived from thermoplastic olefin ("TPO") compositions such as those disclosed U.S. Pat. No. 4,480,065; U.S. Pat No. 4,412,016 and U.S. Pat. No. 4,439,573.

TPO compositions are blends of synthetic rubber and polyolefins such as polypropylene and polyethylene. Because articles made from TPO compositions have gained acceptance in the automotive industry as body parts and the like, it is important that paint sufficiently adheres to the TPO composition to withstand petroleum fluids such as gasolines and the like.

Articles formed of TPO blends which contain substantial amounts of polypropylene exhibit poor adherence for coating paints. These compositions therefore must be treated prior to applying coating materials such as paints by the application of interlayer coatings to promote adhesion. Unfortunately, articles made from TPO compositions are difficult to treat so that the paint adheres against the action of petroleum fluids such as gasolines which dissolve the interlayer coatings. Many paints either do not adhere to the TPO composition, or peel or chip away under normal use, high humidity conditions, or in the presence of fuels or solvents.

Various methods have been tried to improve the adherence of TPO compositions having substantial amounts of polypropylene and/or rubber for paints. Methods of the art have employed primers or adhesion promoters such as chlorinated polyolefins, as well as surface treatments. Although these methods have improved the adherence of these compositions for coating materials such as paints, these methods have not been entirely satisfactory. For example, adhesion promoters such as chlorinated olefins are suspectable to attack by petroleum fluids such as gasolines. Also, the prior art methods for increasing adherence of polymer compositions are costly and time consuming.

A need therefore exists for polymer compositions that show improved adherence for coatings such as paints to enable manufacture of coated polymer compositions which show improved resistance to attack by fluids.

SUMMARY OF THE INVENTION

Thermoplastic olefin compositions having improved fluid resistance are painted with flexible coatings such as polyurethanes paints and the like to form the articles of manufacture which comprise the present invention. These compositions include crystalline or semi-crystalline polyolefins, such as polypropylene, polyethylene, or mixtures thereof, with a first rubber component of an ethylene-propylene rubber having a relatively high molecular weight and a second rubber component of an ethylene-propylene rubber having a relatively low molecular weight. Advantageously, the first rubber component has a molecular weight of 4 to 200 times that of the second rubber component.

The polymer blends of the invention comprise 90–40% of a crystalline or semi-crystalline polyolefin, between 10% and 50% by weight of the first rubber component, and between 1 and 20% by weight of the second rubber component. The first and second rubber components are ethylene-propylene elastomers, preferably ethylene-propylene-diene elastomers.

The first rubber component preferably has a Mooney Viscosity ($ML_{1+2}$, 100° C.) of between about 10 and 120, and the second rubber component preferably has a number average molecular weight of between 1,000 and 10,000. Useful low molecular weight rubbers include ethylene-propylene-dicyclopentadiene and the like. Useful high molecular weight rubbers include ethylene-propylene-ethylidene-norbornene ("ENB") and the like. The diene content of the first rubber component will typically be between 0 and 10%, preferably between 1 and 7% and more preferably between about 3 and 5%. The first and second rubber components are utilized in a weight ratio of between about 2:1 and 10:1, and preferably about 3:1 to 5:1. Preferably, the second rubber is an ethylene-propylene-diene rubber having a diene content of at least 3%, preferably at least about 7% and usually 10% or greater.

In a further embodiment of the invention, the polymer blends can include an agent for compatibilizing the crystalline or semi-crystalline polyolefin with the first and second ethylene-propylene-diene rubber components. The compatibilizing agent can be a copolymer of polypropylene with a polar compound. Useful compatibilizing agents may include copolymers of polypropylene with any of polystyrene, polyester, polyurethane, acrylic compounds, or mixtures thereof. These compatibilizing agents typically have a number average molecular weight below 100,000. Particularly useful compatibilizing agents include copolymers of polypropylene with polystyrene-co-acrylonitrile, especially copolymers of polypropylene polystyrene-co-acrylonitrile grafted with carboxylic acid anhydrides and polypropylene grafted in styrene-co-hydroxypropyl methacrylate. Useful carboxylic anhydrides include phthalic anhydride, particularly maleic anhydride.

Having briefly summarized the invention, the invention will now be described in detail by reference to the following specification and non-limiting examples. Unless otherwise specified, all percentages are by weight and all temperatures are in degrees Celsius.

DETAILED DESCRIPTION OF THE INVENTION

Conventional polypropylenes can be employed as the crystalline or semi-crystalline polyolefin in the polymer blends of the invention. These may be blended with polyethylenes, if desired. Copolymers of propylene and ethylene also may be used as the crystalline or semi-crystalline polyolefin. When a copolymer of propylene and ethylene is utilized, the copolymer either can be in the form of a random copolymer, a block copolymer, or a graft copolymer. Other copolymers of ethylene and $C_3$–$C_8$ alpha-olefins can also be used.

The crystallinity of the crystalline or semi-crystalline polyolefin can vary from substantially amorphous to partially crystalline. As used herein, the terminology "crystalline or semi-crystalline polyolefin" refers to olefins that are characterized by a sufficient degree of crystallinity, e.g. about 70–100%, such that their behavior is substantially that of a crystalline polyolefin ("crystalline") or by a degree of crystallinity, e.g. about 30–70%, sufficient to cause their behavior to exhibit substantial but not full crystalline polyolefin behavior ("semi-crystalline"). When polypropylene is used as the crystalline or semi-crystalline polyolefin, the polypropylene has 30–98% crystallinity, and typically between 60 and 70% crystallinity, as determined by X-ray analysis or solvent extraction. The terminology "substantially crystalline" is used to designate those polyolefins having crystallinity of between 30 and 98%.

Although any crystalline or semi-crystalline polyolefins can be used, the most preferred components are polypropylenes, polyethylenes, ethylene-propylene copolymers and mixtures thereof. Isotactic or syndiotactic polyolefins such as polypropylene are typically used.

The rubber components may constitute up to about 60% of the compositions of the invention. The amounts of the first and second ethylene-propylene rubbers may individually constitute 10 to 50 and 1 to 20 weight percent, respectively, of the compositions of the invention. In the ethylene-propylene-diene rubber components, the ethylene content can be 20 to 80 mole percent of the rubber, polypropylene can be 20 to 80 mole percent of the rubber, and diene can be from 0–20 and preferably 2–20 mole percent of the rubber. Useful dienes include, but are not limited to, those having between about 4 to 15 carbons.

The rubber components employed in the blends of the invention may be any rubber that is compatible or may be rendered compatible with the other ingredients of the blend. The term "compatible" is intended to mean that when the components of the blend are combined, the resultant blend can be molded, extruded or otherwise formed or shaped into commercially useful articles. The primary requirements are that the rubber has sufficiently low viscosity so that it can be dispersed into the blend. Fillers and coupling agents may be used to render chemically dissimilar components sufficiently compatible to be suitable in many cases.

Rubber materials which offer an excellent compromise of cost and performance are ethylene-propylene-diene rubbers and styrene-butadiene rubbers. Other useful rubber materials include polymers containing 1,4-butadiene, isoprene, 1,4-hexadiene, ethylidene-norbornene and copolymers of ethylene-propylene with these diene rubbers. Examples of useful rubbers are terpolymers of ethylene, propylene with dicyclopentadiene as well as terpolymers of ethylene, propylene with ethylidene-norbornene. Useful low molecular weight diene rubbers include ethylene-propylene-dicyclopentadiene and the like. Useful high molecular weight rubbers include ethylene-propylene-ethylidene-norbornene. Less preferred but also suitable are polyisoprene, bromobutyl rubber, and nitrile rubber. Combinations of these hydrocarbons and copolymers also can be used.

The following is a list of other rubber materials which may be employed in the invention:

| Name | Type | Supplier |
| --- | --- | --- |
| Polysar xG006 | Ethylene-Propylene-ENB | Polysar |
| Nordel 2722 | Ethylene-Propylene-Rexadione | DuPont |
| Nordel 1320 | Ethylene-Propylene-diene | |
| Vistalon 2504 | Ethylene-Propylene-diene | Exxon |
| Kiton G 11650 | Styrene-Ethylene-Butadiene Styrene | Shell |
| Stereon 840 A | Styrene-Butadiene | Firestone |
| GE 7340 | Hydrogenated Styrene-Butadiene | Goldsmith & Eggleton |
| Natsyn 220 | Polyisoprene | Goodyear |
| Dutral TER 4334 | Ethylene-Propylenediene | Enichem |

The first rubber is preferably an ethylene-propylene-diene rubber having a Mooney Viscosity ($ML_{1+2}$, 100° C.) of between about 10 and about 120, preferably from about 25 to about 80. The first rubber component may also have a number average or weight average molecular weight of between about 40,000 and 300,000. Advantageously, the molecular weight of the first component is between about 4 to 200 times, generally between 10 and 150 times, and preferably about 8 to 40 times, that of the second rubber component. Most advantageously, the second rubber is an ethylene-propylene-diene rubber, and has a number average molecular weight of between 1,000 and 10,000, preferably between 2,000 and 8,000 and more preferably between 5,000 and 7,000.

The blends of the invention can further comprise an agent for compatibilizing the crystalline or semi-crystalline polyolefin with the first and second ethylene-propylene-diene rubber components. Compatibilizing agents typically have a molecular weight below about 100,000. The compatibilizing agent can be a copolymer of polypropylene with a polar compound such as polystyrene, polyester, polyurethane, an acrylic compound, or a mixture thereof. Useful compatibilizing agents include well-known copolymers of polystyrene-co-acrylonitrile. Particularly useful compatibilizing agents include commercially available copolymers of polystyrene-co-acrylonitrile grafted with maleic anhydride, and commercially available copolymers of polypropylene grafted with poly(styrene-hydroxypropyl methacrylate).

The polymer blends of this invention generally have a melt flow rate of at least about 10 and typically 12 or greater. These enable the blends to be molded into complex articles, such as automobile bumpers, bumper covers, and interior or exterior trim.

It is known that paints adhere to polymer blends through the use of an adhesion promoter. In conventional polymer blends, a crystalline material such as polypropylene is mixed with an ethylene-propylene rubber component. The rubber particles present on the surface of an article molded from the blend provide sites to which the adhesion promoter can bond. The surface morphology of these molded articles shows the rubber particles as "islands" in a "sea" of the crystalline material. Thus, the adhesion promoter bonds with these islands and bridges between adjacent islands.

Without wishing to be bound by theory, it is believed that in the present invention, that the use of both high and low molecular weight ethylene-propylene-diene rubber components provides an enhanced surface morphology, with many more "islands" to which the adhesion promoter can attach, while providing shorter bridges between islands. This provides a more secure bond for the adhesion promoter and thus a surface which is more receptive to paint and which bonds more strongly thereto. In addition, it is believed that these terpolymer rubbers provide a stronger bond between the adhesion promoter and the rubber, possibly due to the enhanced permeability of the terpolymers.

The polymer blends of the invention have excellent paintability, a broad range of stiffness values, as well as high impact and tensile strengths which make them suitable for automotive applications. The polymer compositions of the invention can be molded or otherwise formed or shaped to produce articles that are lightweight, durable, and have surfaces that are paint receptive. The articles can be treated with an adhesion promoter and then painted, and the paint cured at temperatures exceeding 80° C. to produce a durable and attractive finish. Any of the conventional adhesion promoters can be used with good results.

The polymer blends of the invention can be coated with paints, particularly with paints such as commercially available two-component polyurethanes, to provide products with superior fluid resistance. The blends of the invention also may be coated with paints which have active functional groups such as acrylics, polyesters, epoxy resins, carbodiimides, urea resins, melamine-formaldehyde resins, enamines, ketimines, amines, and isocyanates to provide products with improved fluid resistance. These types of paints are well known in the paint and coatings industry.

Various additives can be incorporated into the polymer blends of the invention to vary the physical properties of the blends of the invention while retaining good paint adhesion. These additives may include pigments, dyes, processing aids, anti-static additives, surfactants and stabilizers such as those which generally are used in polymeric compositions. Particularly useful additives may include styrene-maleic anhydride copolymers and cationic surfactants for improving moisture resistance, and well known copolymers such as ethylene-acrylic acid copolymers ("EAA") and ethylene-methacrylic acid copolymers ("EMAA"), or mixtures or blends thereof.

The fluid resistance of preforms of the polymer blends of the invention bearing a single coating of 2-part commercially available polyurethane is evaluated by placing the coated preforms into a gasoline bath. The gasoline bath may be mixtures of any of 90% unleaded gasoline and 10% ethanol; 90% unleaded gasoline and 10% methanol; or 100% unleaded gasoline. The preforms employed are 2 1/2" squares, or possibly 1"×3" bars. The coated preform remains immersed in the gasoline bath until failure, that is, paint at the edges of the preform curls away from the preform. The coated preform then is removed from the bath and the time to failure recorded. The fluid resistance of the coated preforms are shown in Table I.

The % peel of the paint from the preform also is a measure of the ability of the preform to retain paint against the action of petroleum fluids such as gasoline. The painted preform is removed from the gasoline bath after a 30-minute immersion and measuring the area, if any, that is free of paint. The % peel is determined by dividing the area of the preform free of paint by the original painted area of the preform. Low % peel is desired.

EXAMPLES

The invention will now be described by reference to the following non-limiting examples.

Examples 1–11

The blends of Examples 1–11 are formed by blending the components in the amounts given in Table I. Blending of the components is performed by well known methods and devices such as Banbury mixers and extrusion equipment. The polymer blends can be molded into shaped preforms by known methods such as extrusion, injection molding, blow molding, or thermoforming. The shaped preforms of the polymer blends are coated with a single layer of paint of two-part polyurethanes in accordance with well known methods such as spraying. The polymer blends also can be pelletized for storage and shipment prior to molding into shaped articles.

TABLE I

| COMPONENT (%) | EX 1 | EX 2 | EX 3 | EX 4 | EX 5 | EX 6 | EX 7 | EX 8 | EX 9 | EX 10 | EX 11 |
|---|---|---|---|---|---|---|---|---|---|---|---|
| Polypropylene[1] | 70 | 65 | 60 | 60 | 60 | 60 | 60 | 60 | 60 | 55 | 60 |
| Ter-(EPDM)-E[2] | 20 | 25 | 30 | 30 | 30 | 30 | 30 | 30 | | | |
| T-CP80[3] | | | | 10 | | | | | | | |
| T-68-ENB[4] | | | | | 10 | | | | | | |
| T-65-DCPD[5] | | | | | | | | 10 | | | |
| T-55-DCPD[6] | 10 | 10 | 5 | | | | | | 10 | 5 | 5 |
| T-67-ENB[7] | | | | | | 10 | | | | | |
| Ter-EPDM[8] | | | | | | | | | 20 | 35 | 30 |
| A3500[9] | | | | | | | | | 10 | 5 | |
| Gasoline Resistance[10] | >30 | >30 | >30 | 20 | 23 | 25 | 25 | 60 | >150 | >90 | >30 |
| % PEEL[11] | 0 | 0 | 0 | <7 | <5 | <5 | <5 | 0 | 0 | 0 | 0 |

Notes:
[1]Polypropylene of MW > 100,000
[2]Ter polymer of ethylene-propylene-diene, Mooney Viscosity of 45 ($ML_{1+2}$, 100° C.) from Uniroyal Chemical Co.
[3]Low molecular weight ethylene-propylene copolymer
[4]Ethylene-propylene-[ethylidene-norbornene] with C2:C3 of 45:55 from Uniroyal Chemical Co.
[5]10% ter of Dicyclopentadiene with a $C_2:C_3$ = 48:52, Mn = 7000, available from Uniroyal Chemical Co.
[6]13% ter of Dicyclopentadiene with a $C_2:C_3$ = 49:51, Mn = 5200, available from Uniroyal Chemical Co.
[7]9% ter of Ethylene norbornene with $C_2:C_3$ of 46:54, Mn = 7500, available from Uniroyal Chemical Co.
[8]Ethylene-propylene-diene terpolymer available from Uniroyal Chemical Co.
[9]Graft copolymer of polypropylene with poly(styrene-hydroxypropyl methacrylate) from Nippon Oil and Fat Co.
[10]Minutes to failure; gasoline bath of 90% unleaded gasoline and 10% ethanol.
[11]% peel at 30 minutes Comparison Examples 12–16

Comparison examples 12–16 are produced in the same manner as Examples 1–11 except that the first and second ethylene-propylene-diene rubbers are not employed. The compositions and the fluid resistance of these comparative examples is shown in Table II.

TABLE II

| COMPONENT (%) | EX. 12 | EX. 13 | EX. 14 | EX. 15 | EX. 16 |
|---|---|---|---|---|---|
| POLYPROPYLENE[1] | 70 | 70 | 70 | 70 | 70 |
| ETHYLENE-PROPYLENE COPOLYMER[2] | 30 | | | | |
| ETHYLENE-PROPYLENE COPOLYMER[3] | | 30 | | | |
| ETHYLENE-PROPYLENE COPOLYMER[4] | | | 30 | | |
| ETHYLENE-PROPYLENE COPOLYMER[5] | | | | 30 | |
| ETHYLENE-PROPYLENE COPOLYMER[6] | | | | | 30 |
| GASOLINE RESISTANCE[7] | 5 | 7 | 11 | <10 | 12 |
| % PEEL[8] | >90 | >90 | >90 | >90 | >90 |

[1]Polypropylene of molecular weight of more than 100,000
[2]Ethylene-propylene copolymer of 72% ethylene, 28% polypropylene, MW = 703,000
[3]Ethylene-propylene copolymer of 72% ethylene, 28% polypropylene, Mw = 50,000
[4]Ethylene-propylene copolymer of 76% ethylene, 24% polypropylene, MW = 50,000
[5]Ethylene-propylene copolymer of 76% ethylene, 24% polypropylene, MW = 50,000
[6]Ethylene-propylene copolymer of 76% ethylene, 24% polypropylene, MW = 50,000
[7]Minutes to failure; gasoline bath of 90% unleaded gasoline and 10% ethanol
[8]% peel at 30 minutes Upon reviewing the data, it is seen that both the high and low molecular weight EP or EPD rubbers are present to obtain enhanced paint bonding to the molded polymer blend as shown by the gasoline resistance to peel.

Examples 17–24

The blends of Examples 17–24 are formed by blending the components in the amounts given in Table III. Blending of the components is performed by well known methods and devices such as Banbury mixers and extrusion equipment. The polymer blends can be molded into shaped preforms by known methods such as extrusion, injection molding, blow molding, or thermoforming. The shaped preforms of the polymer blends are coated with a single layer of paint of two-part polyurethanes in accordance with well known methods such as spraying. The polymer blends also can be pelletized for storage and shipment prior to molding into shaped articles.

TABLE III

| COMPONENT (%) | EX 17 | EX 18 | EX 19 | EX 20 | EX 21 | EX 22 | EX 23 | EX 24 |
|---|---|---|---|---|---|---|---|---|
| PP[1] | 65 | 65 | 65 | 65 | 65 | 65 | 65 | 65 |
| EPDM-S[2] | | | | | | | | 30 |
| EPDM-I[3] | 30 | | | | 15 | 15 | 15 | |
| EPDM-K[4] | | 30 | | | 10 | | | |
| EPDM-G[5] | | | 30 | | | | | |
| EPDM-A[6] | | | | 25 | | | | |
| EPDM-D[7] | | | | | 15 | | | |
| EPDM-E[8] | | | | | | 15 | | |
| EPR-A[9] | | | | | | | 15 | |
| T-55-DCPD[10] | 5 | 5 | 5 | 10 | 5 | 5 | 5 | |
| T-M201[11] | | | | | | | | 5 |
| Gasoline Resistance[12] | >60 | >60 | >60 | >60 | >60 | >60 | >60 | >60 |
| % PEEL[13] | 0 | 0 | 0 | 0 | 0 | 0 | 0 | 0 |

Notes:
[1]PP = Polypropylene of MW > 100,000
[2]EPDM-S = 5% Ethylidene norbornene, C2/C3 = 52/48, Mooney Viscosity = 45 ($ML_{1+4}$, 100° C.)
[3]EPDM-I = 4% Ethylidene-norbornene, C2/C3 = 58/42, Mooney Viscosity = 35 ($ML_{1+4}$, 100° C.)
[4]EPDM-K = 4.1% Ethylidene-norbornene, C2/C3 = 61/39, Mooney Viscosity = 44 ($ML_{1+4}$, 100° C.)
[5]EPDM-G = 4.4% Ethylidene-norbornene, C2/C3 = 50/50, Mooney Viscosity = 40 ($ML_{1+4}$, 100° C.)
[6]EPDM-A = 4.6% Hexadiene, C2/C3 = 52/48, Mooney Viscosity = 29 ($ML_{1+4}$, 100° C.)
[7]EPDM-D = 5% Ethylidene-norbornene, C2/C3 = 71/29, Mooney Viscosity = 26 ($ML_{1+4}$, 100° C.)
[8]EPDM-E = 3% Ethylidene-norbornene, C2/C3 = 75/25, Mooney Viscosity = 25 ($ML_{1+4}$, 100° C.)
[9]EPR-A = 0% diene, C2/C3 = 68/32, Mooney Viscosity = 36 ($ML_{1+4}$, 100° C.)
[10]T-55-DCPD = 13% Dicyclopentadiene C2/C3 = 49/51, MW = 5,200 Mn
[11]T-M201 = 13% Dicyclopentadiene C2/C3 = 49/51 6,500, MW = 6,500 Mn 4% maleic anhydride
Mn = number average molevular weight Other aspects of the invention will be apparent to those skilled in the art from consideration of the specification, or from practice of the invention disclosed herein. It is intended that the specification and examples be considered as exemplary only, with the scope and spirit of the invention being indicated by the following claims.

What is claimed is:

1. An article of manufacture having improved resistance to fluids comprising a substrate formed of a polymer blend and having one or more surfaces, said polymer blend consisting essentially of:

a substantially crystalline polyolefin;

about 10% to 50% by weight of the composition of a first rubber component of an ethylene-propylene rubber having a Mooney Viscosity ($ML_{1+4}$, 100° C.) of between about 10 and about 120; and about 1 to 20% by weight of a second rubber component of an ethylene-propylene rubber having a number average molecular weight of between about 1,000 and 10,000.

2. The article of claim 1 wherein the polyolefin is a polypropylene, a polypropylene blended with a polyethylene, or a copolymer of ethylene with a $C_3$–$C_8$ alpha-olefin.

3. The article of claim 2 wherein the polyolefin is polypropylene having 30–98% crystallinity.

4. The article of claim 1 wherein the polyolefin comprises semi-crystalline polyethylene, semi-crystalline polypropylene or mixtures thereof.

5. The article of claim 1 wherein the first rubber component is an ethylene-propylene-diene rubber which has a Mooney Viscosity ($ML_{1+4}$, 100° C.) of between about 25 and about 80.

6. The article of claim 1 wherein the first and second rubber components are present in a weight ratio of between about 2:1 and 10:1, and the molecular weight of the second rubber component is about 5,000 to 7,000.

7. The article of claim 1 wherein the second rubber component is an ethylene-propylene-diene rubber having a diene content of at least about 3%.

8. The article of claim 7 wherein the second rubber component has a diene content of at least about 10% and wherein the first and second polymers are present in a weight ratio between about 3:1 and 5:1.

9. The article of claim 6 wherein the first rubber component is an ethylene-propylene-diene rubber having a diene content of about 1 and 10%.

10. The article of claim 1 wherein the first rubber component is ethylene-propylene-ethylidene norbornene and the second rubber component is ethylene-propylene-dicyclopentadiene.

11. The article of claim 1 further comprising an agent for compatibilizing the polyolefin and the first and second rubber components.

12. An article of manufacture having improved resistance to fluids comprising a substrate fromed of a polymer blend and having one or more surfaces, said polymer blend consisting essentially of:

a substantially crystalline polyolefin;

about 10% to 50% by weight of the composition of a first rubber component of an ethylene-propylene rubber having a Mooney Viscosity ($ML_{1+4}$, 100° C.) of between about 10 and about 120;

a compatibilizing agent of a copolymer of polypropylene with a polar compound; and about 1 to 20% by weight of a second rubber component of an ethylene-propylene rubber having a number average molecular weight of between about 1,000 and 10,000.

13. The article of claim 12 wherein the compatibilizing agent is a copolymer of polypropylene with at least one of either polystyrene, polyester, polyurethane, an acrylic compound, or a mixture thereof.

14. The article of claim 1 wherein the polyolefin is polypropylene having 30–98% crystallinity, the first rubber component is an ethylene-propylene-diene having a Mooney Viscosity ($ML_{1+4}$, 100° C.) of between about 25 and 80, and the second rubber component is an ethylene-propylene-diene rubber having a diene content of at least 10% and a number average molecular weight of between about 5,000 and 7,000.

15. The article of claim 1 wherein the one or more surfaces of the substrate include a coating thereon.

16. The article of claim 14 wherein the one or more surfaces of the substrate include a coating thereon.

17. The article of claim 15 wherein the coating comprises a two part polyurethane.

18. The article of claim 16 wherein the coating comprises a two part polyurethane.

19. The article of claim 1 wherein the substantially crystalline polyolefin is present in an amount of between about 40–90% by weight of the composition.

20. An article of manufacture having improved resistance to fluids comprising a substrate formed of a polymer blend and having one or more surfaces, said polymer blend consisting essentially of:

a substantially crystalline polyolefin of polyethylene, polypropylene or mixtures thereof, said polyolefin being present in an amount of between about 40–90% by weight of the composition;

about 10% to 50% by weight of the composition of a first rubber component of an ethylene-propylene rubber having a Mooney Viscosity ($ML_{1+4}$, 100° C.) of between about 25 and about 80; and about 1 to 20% by weight of a second rubber component of an ethylene-propylene rubber having a number average molecular weight of between about 1,000 and 10,000.

* * * * *